United States Patent
Lienard et al.

(10) Patent No.: US 7,702,138 B2
(45) Date of Patent: Apr. 20, 2010

(54) METHOD AND APPARATUS FOR PROCESSING IMAGES FOR SUBTRACTED ANGIOGRAPHY

(75) Inventors: Jean Lienard, Igny (FR); Julien Haddad, Paris (FR)

(73) Assignee: General Electric Company, Schenectady, NY (US)

( * ) Notice: Subject to any disclaimer, the term of this patent is extended or adjusted under 35 U.S.C. 154(b) by 926 days.

(21) Appl. No.: 11/401,163

(22) Filed: Apr. 10, 2006

(65) Prior Publication Data
US 2007/0036269 A1    Feb. 15, 2007

(30) Foreign Application Priority Data
Apr. 11, 2005 (FR) .................................. 05 03547

(51) Int. Cl.
*G06K 9/00* (2006.01)
*H05G 1/64* (2006.01)
(52) U.S. Cl. ...................... 382/128; 382/275; 378/98.11
(58) Field of Classification Search ................. 382/100, 382/128, 129, 130, 131, 132, 133, 134, 154, 382/162, 168, 181, 190, 210, 232, 255, 260, 382/274, 276, 305, 275; 378/98.11, 98.12, 378/62

See application file for complete search history.

(56) References Cited

U.S. PATENT DOCUMENTS

| | | | | |
|---|---|---|---|---|
| 4,456,926 A | * | 6/1984 | Kruger et al. | 378/98.12 |
| 4,559,557 A | * | 12/1985 | Keyes et al. | 378/98.11 |
| 6,760,401 B2 | * | 7/2004 | Schmitz et al. | 378/62 |
| 2004/0228511 A1 | * | 11/2004 | Lienard et al. | 382/132 |

OTHER PUBLICATIONS

C Tomasi and R. Manduchi, "Bilateral Filtering for Gray and Color Images", 1998 IEEE.*
Junhwan et al., "Automatic selection of mask and arterial phase images for temporally resolved MR digital subtraction angiography", Magnetic Res. In Med., vol. 48, No. 6, Dec. 2002,pp. 1004-1010, (2002).
Ohishi et al., "Extraction of blood vessel through new temporal filtering in angiographic sequence", Optics Communication in Netherlands vol. 100, No. 1-4, Jul. 1993, pp. 72-78, (1992).
Kruger et al., "Digital Angiography using a matched filter", IEEE Trans. Med. Imaging, vol. MI-1, Jul. 1, 1982, pp. 16-21.

(Continued)

*Primary Examiner*—Seyed Azarian
(74) *Attorney, Agent, or Firm*—Global Patent Operation; Jonathan E. Thomas

(57) ABSTRACT

A first method for processing of a radiological image to be used as a mask image in subtracted angiography wherein processing for reduction of noise present in the mask image adapted to preserve the aspect of the noise in the mask image. A second method for processing of a sequence of subtracted images ($J_n$) obtained by subtraction of a mask image from each of the images in a sequence of images ($I_n$) acquired during angiography of blood vessels in an area of interest (104) of a patient (200), wherein processing for reduction of noise present in the subtracted images ($J_n$) adapted to preserve the aspect of vessels (80) in the subtracted images. A radiography apparatus for implementing a method according to one and/or the other of the first and second methods.

16 Claims, 7 Drawing Sheets

OTHER PUBLICATIONS

Satoru Ohishi, Masahiro Yamaguchi, Nagaaki Ohyama and Toshio Honda, "Extraction of blood vessel through new temporal filtering in angiographic sequence." Optics Communications 100 (1993) 72-78. 1993 Elsevier Science Publishers.

Junhwan Kim, Martin R. Prince, Ramin Zabih, Jeff Bezanson, Richard Watts, Hale E. Erel and Yi Wang. "Automatic Selection of Mask and Arterial Phase Images for Temporally Resolved MR Digital Subtraction Angiography." Magnetic Resonance in Medicine 48:1004-1010 (2002). Wiley InterScience. 2002 Willey-Liss, Inc.

0503547000 DU Nov. 4, 2005. V/Ref. 241900 D23006TM. Paris France Dec. 6, 2005.

* cited by examiner

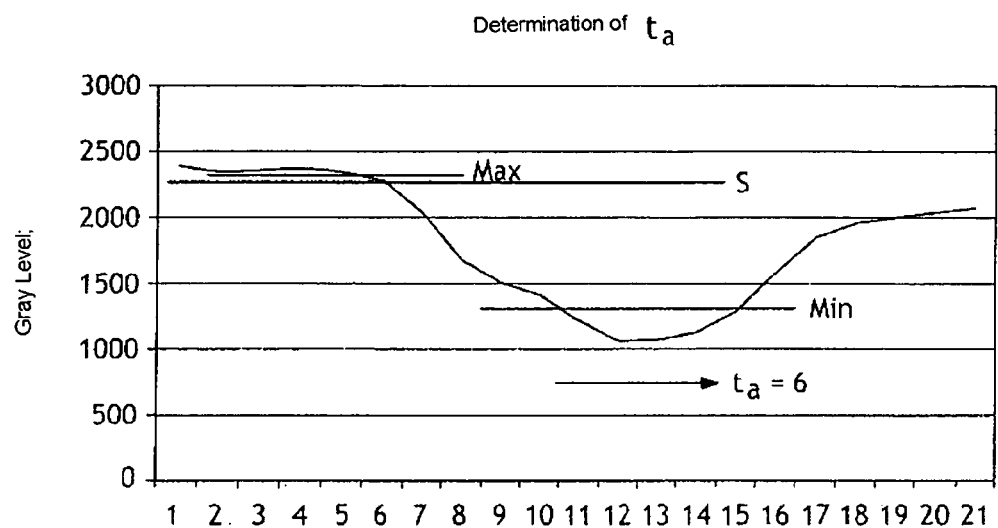
FIG_7
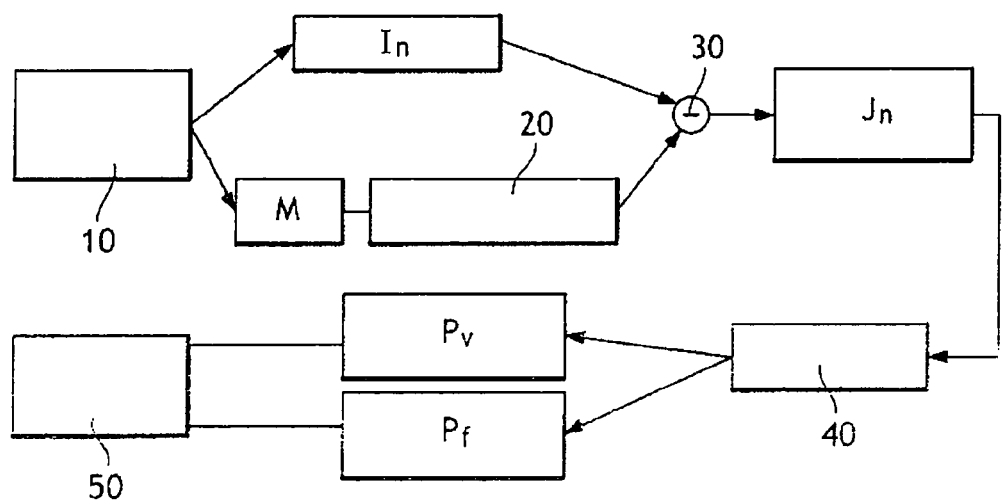
FIG_8

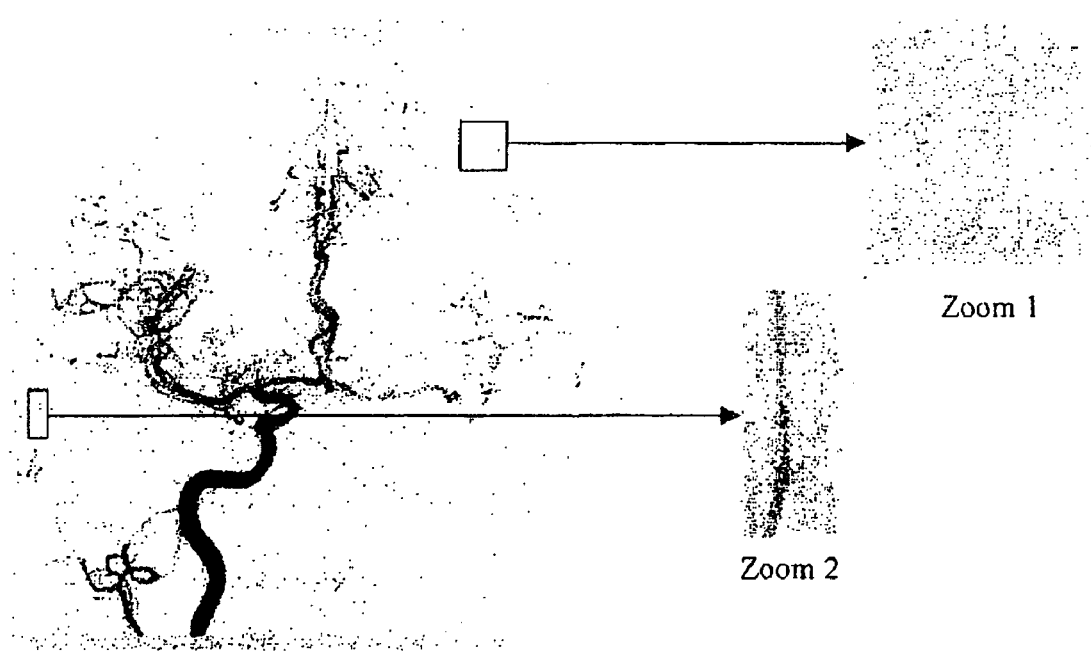
FIG_9

METHOD AND APPARATUS FOR PROCESSING IMAGES FOR SUBTRACTED ANGIOGRAPHY

CROSS-REFERENCE TO RELATED APPLICATIONS

This application claims the benefit of a priority under 35 USC 119 (a)-(d) to French Patent Application No. 05 03547 filed Apr. 11, 2005, the entire contents of which are hereby incorporated by reference.

BACKGROUND OF THE INVENTION

The field of the invention is imaging and in particular imaging in X-ray medical imagery. The invention is more particularly concerned with a method and an apparatus for processing radiological images, and particularly images used for example in a vascular examination by Digital Subtracted Angiography (DSA).

Angiography is a medical imagery technique used for a diagnosis or therapeutic purpose during which a practitioner makes an examination of the blood vessels of a patient using X-rays. This technique more precisely allows for visualization of blood vessels by injecting a contrast product (typically based on iodine) that mixes with the blood and temporarily makes it opaque to X-rays.

The contrast product can be injected either intravenously, or intra-arterially using a catheter inserted into the lumen of the arteries. The introduction of the catheter and guidance as far as the artery of interest enables the practitioner to inject the contrast product only locally. If the examination is more invasive than an intravenous injection, the quantity of the contrast product used is lower and the image quality is better because the display is not disturbed by opacification of nearby arteries and/or veins, and the contrast product is significantly less diluted in the blood.

In angiography, an injected image is an image taken while the contrast product is present in the patient's body. In the opposite sense, a non-injected image is an image taken without use of the contrast product.

Since the practitioner's primary interest is the opacified vessel, it is desirable to eliminate the remainder of the patient's anatomy (in other words background structures such as muscles, bones, etc.), which could hide parts of blood vessels due to absorption of the X-rays. The background structures are typically removed by subtracting from an injected image a non-injected image of the area of interest taken under the same conditions. This non-injected image is then called the mask image and the resulting image is said to be subtracted. All that remains in the resulting image is then the arteries containing the contrast product.

In general, an attempt is made to minimize the dose of X-rays applied to the patient during acquisition of the radiographic images. The result is that images are usually affected by a quantum noise. Moreover, this noise is amplified by the subtraction operation and then becomes even more visible on a uniform background. Noise reduction techniques have been proposed that make use of an intra-image spatial filtering. However, these techniques usually cause blur and smoothing of vessel edges. Furthermore, since this spatial filtering modifies the shape of the noise power spectrum, the use of these techniques tends to generate noise clusters, with a granular aspect that practitioners do not accept.

BRIEF DESCRIPTION OF THE INVENTION

Therefore there is a need for improved processing of images, particularly angiography images, capable of reducing noise without modifying the contrast of vessels or contributing to making the edges of vessels blurred.

According to an embodiment of the invention, a method and apparatus for processing of a radiological image to be used as a mask image in subtracted angiography comprises noise reduction processing for the noise present in the mask image adapted to preserve the aspect of the noise in the mask image. For example, this processing may be done by application of a bilateral filter to the mask image.

According to another embodiment of the invention, a method and apparatus for processing of a sequence of subtracted images obtained by subtraction of a mask image from each of the images in a sequence of images acquired during angiography of blood vessels in an area of interest of a patient comprises noise reduction processing for the noise present in subtracted images adapted to preserve the aspect of vessels in the subtracted images.

Other aspects, purposes and advantages of the invention will become clearer after reading the detailed description of embodiments of the invention given below as a non-limitative example, with reference to the attached drawings in which:

FIG. 7 shows a determination of the arrival time $t_a$ of the contrast product at a vascular point or pixel;

FIG. 8 is a flow chart illustrating one embodiment according to which first and second embodiments of the invention are combined; and FIG. 9 illustrates an evaluation of performances of an embodiment of the invention.

DETAILED DESCRIPTION OF THE INVENTION

Figure 1:
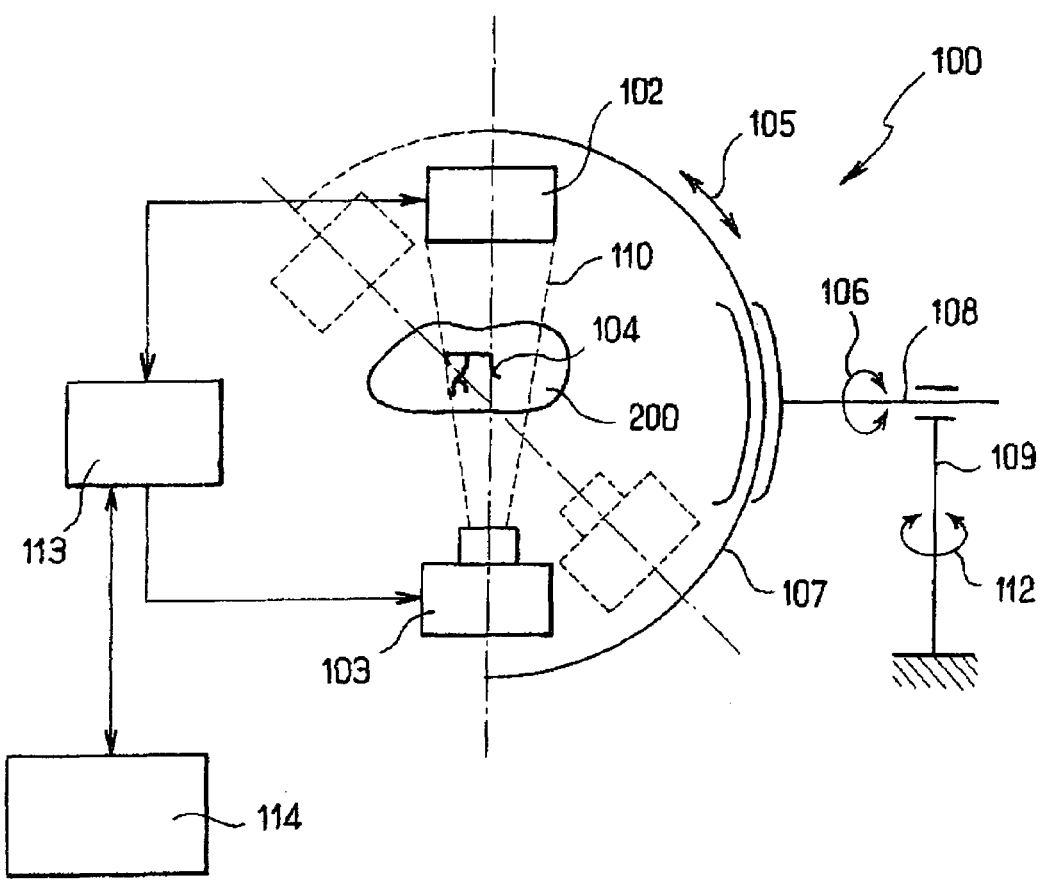
FIG. 1 shows a principle diagram of a radiography apparatus that might implement the method according to an embodiment of the invention.

FIG. 1 shows a radiography apparatus 100 that comprises means for taking radiographic images 102 and means for emitting radiation 103 in the form of an X-ray source. The X-ray source 103 and the means of taking radiographic images are fixed at each end of a support arm 107 acting as a positioner, in this case resembling a half-circle. The half-circle arm 107 is linked in a sliding relationship to a second arm 108. The second arm 108 itself is linked in rotation to the base plate 109 of the radiography apparatus 100. The base plate 109 is installed free to rotate 112 with respect to the ground.

The arm 108 is essentially capable of making rotation movements 106 about its own axis. The half-circle arm 107 is capable of sliding with respect to the arm 108, such that the half-circle arm makes a rotation movement with respect to the centre of the half-circle forming the arm.

During use, the body of the patient 200 is positioned between the X-ray source 103 and the means of taking radiography images 102 on a support (not shown) such that a region of interest 104 of the patient 200 is within the field 110 of the apparatus.

The radiography apparatus 100 also comprises means for processing 113 including means for receiving data supplied by the means for taking images 102 and capable of controlling the means for emission 103. The means for processing 113 is programmed so that it can use the method according to one possible embodiment of a method. The apparatus 100 may also comprise an interface unit 114 coupled to the means for processing 113, for example comprising means for display, such as a screen and means for control, such as a mouse.

Figure 2:
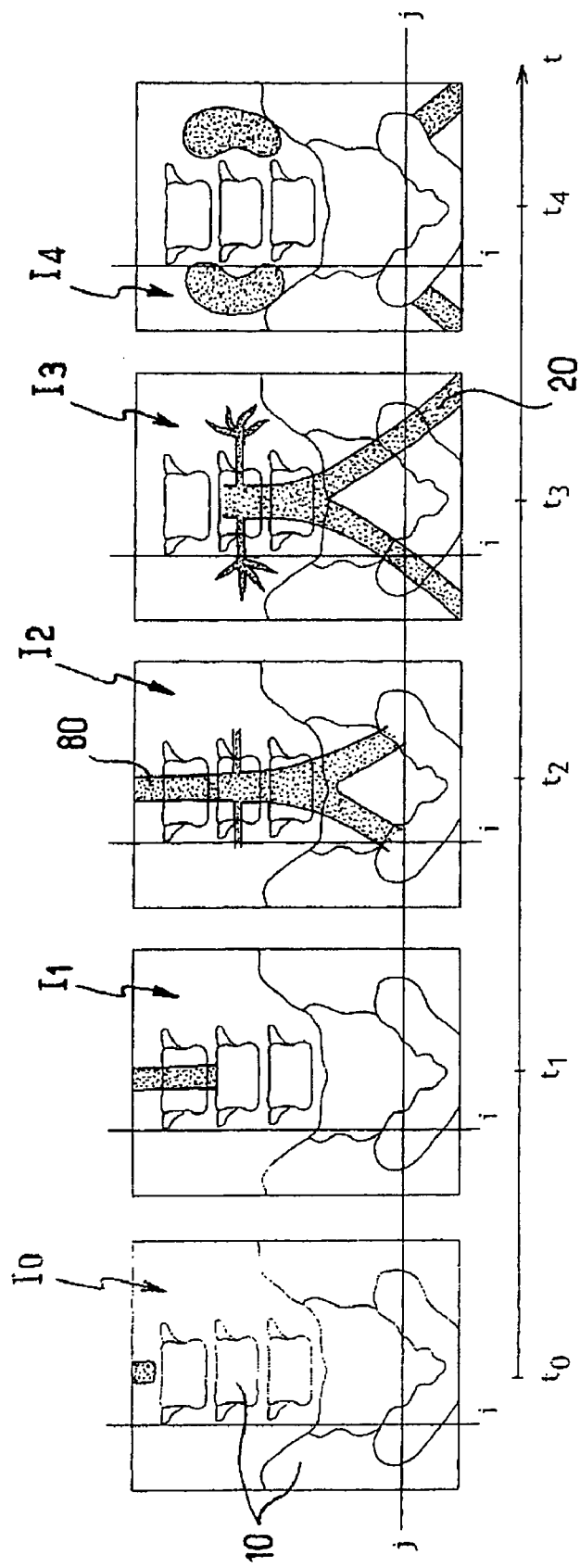
FIG. 2 shows a sequence of images in an area of interest acquired when a contrast product was injected.

FIG. 2 shows a sequence of successive images $I_n$ in the region of interest 104 of the patient 200, acquired when a contrast product has been injected into the blood vessels in the region of interest. FIG. 2 shows a series of five successive images numbered from $I_0$ to $I_4$, which show the progress of the contrast product in the blood network 20 in the region of interest, under the action of the blood circulation of the patient 200. Furthermore, the different images in the sequence show a set of so-called background structures 10 that correspond to all tissues in the region of interest in the patient other than blood vessels. In this illustrative example, only the bones 10 have been shown among all the so-called background structures.

Figure 3:
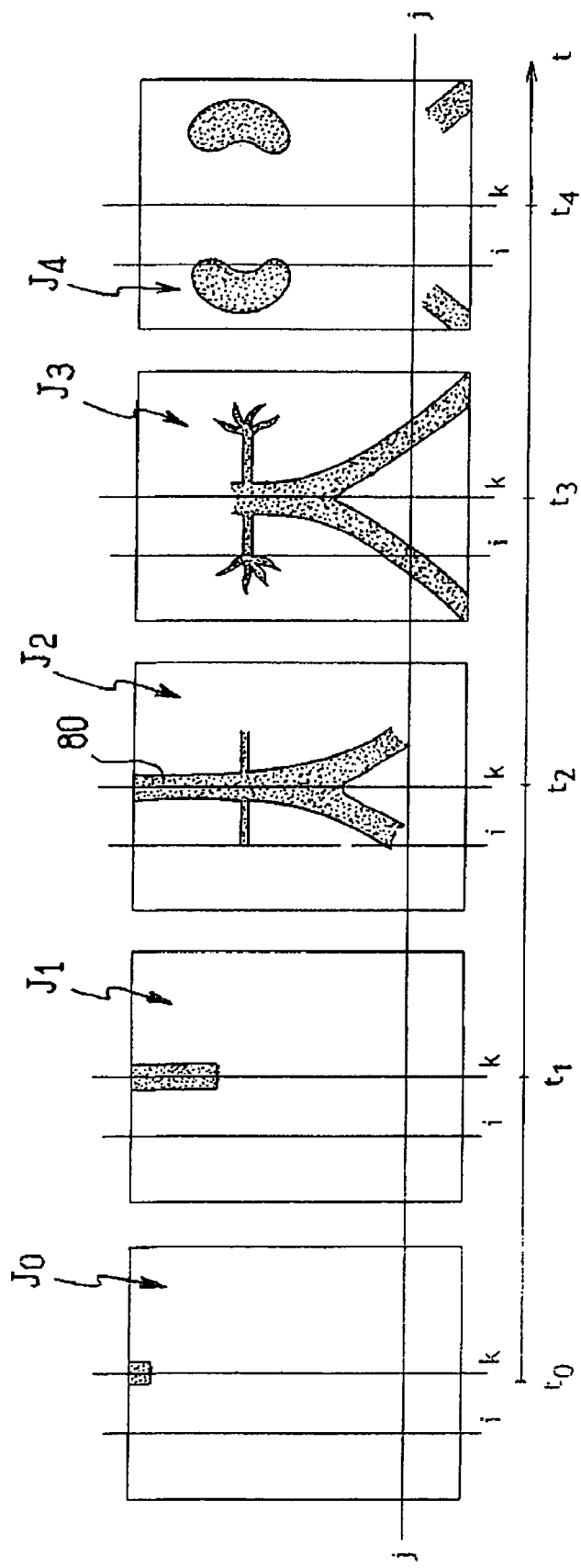
FIG. 3 shows subtracted images in the DSA sequence obtained from the sequence in FIG. 2.

As mentioned above, a mask image of the area 104 acquired when no contrast product is circulating in the blood network 20 of the patient is subtracted from each image $I_n$ in the sequence of injected images. The result is thus a sequence of subtracted images called the DSA sequence. FIG. 3 shows the DSA sequence of subtracted images $J_n$ obtained after subtraction of a mask image (not shown) from images $I_n$ in FIG. 2. On these subtracted images $J_n$, the background structures 10 eliminated by subtraction are no longer visible, and all that remains is the vascular information revealed by circulation of the contrast product.

The set of subtracted images $J_n$ in the DSA sequence is not perfect and includes noise that has to be corrected. As was mentioned above, the mask image also includes noise, and subtraction of this mask image from each of the images $I_n$ makes the noise even more visible in the images $J_n$ in the DSA sequence. In other words, the noise present in the mask image is a noise source in each of the subtracted images $J_n$.

An embodiment of the invention is a method and apparatus for processing to reduce the noise in a DSA sequence of subtracted images, without modifying the vascular information (vessel contrast, vessel edge).

A first possible embodiment of the invention comprises performing a noise reduction processing on noise present in the mask image adapted to preserve the noise aspect in the mask image. Therefore, this processing is contrary to the spatial processing of the mask image (for example using a low pass filter) that might smooth the observed edges in the mask image and introduce artifacts in the subtracted images.

An example of processing for reduction of noise in the mask image adapted to preserve the noise aspect in the mask image comprises a median filter or a bilateral filter (for example a 3×3 filter), adapted particularly to preserve the edges. A bilateral filter is disclosed in C. Tomasi and R. Manduchi, "Bilateral Filtering for Gray and Color Images", Proceedings of the 1998 IEEE, International Conference on Computer Vision, Bombay, India. Since the noise aspect is not modified in the mask image, no artifacts are created in the subtracted images. The use of such a filter (and particularly the bilateral filter) on the mask image can result in a significant noise reduction, typically about 8.6%. Obviously, this mask image processing is done before the subtraction step so that a noise reduction can be observed in each of the subtracted images $J_n$ in the DSA sequence.

In a second possible embodiment of the invention, the reduction of noise in the images $J_n$ of the DSA sequence comprises processing the images $J_n$ in order to reduce noise but without modifying vascular information. This processing is based on inter-image temporal filtering which, unlike the intra-image spatial filtering, has the advantage of reducing noise while maintaining the independence of pixels forming an image. The aspect of images in the DSA sequence is thus preserved by this processing, and particularly the aspect of noise present in these images.

Consider the DSA sequence of subtracted images $J_n$ in FIG. 3. One point (or pixel) on each of these subtracted images may be: (a) either a "vascular point", in other words a point on the image that will be reached by the contrast product at a particular moment in the acquisition, because it corresponds to a point located inside the vascular bed (arteries, veins, capillaries, soft tissues under infusion) or (b) a "background point" located outside the vascular bed (and corresponding to bones or soft tissues remote from the area under infusion). As an example, point or pixel (i, j) in FIG. 3 is a vascular point or pixel reached by the contrast product at time $t_3$ in acquisition of the image $I_3$ corresponding to the subtracted image $J_3$. Point or pixel (k, j) is a background point or pixel located outside the vascular bed and is consequently not reached by the contrast product.

Figure 4:
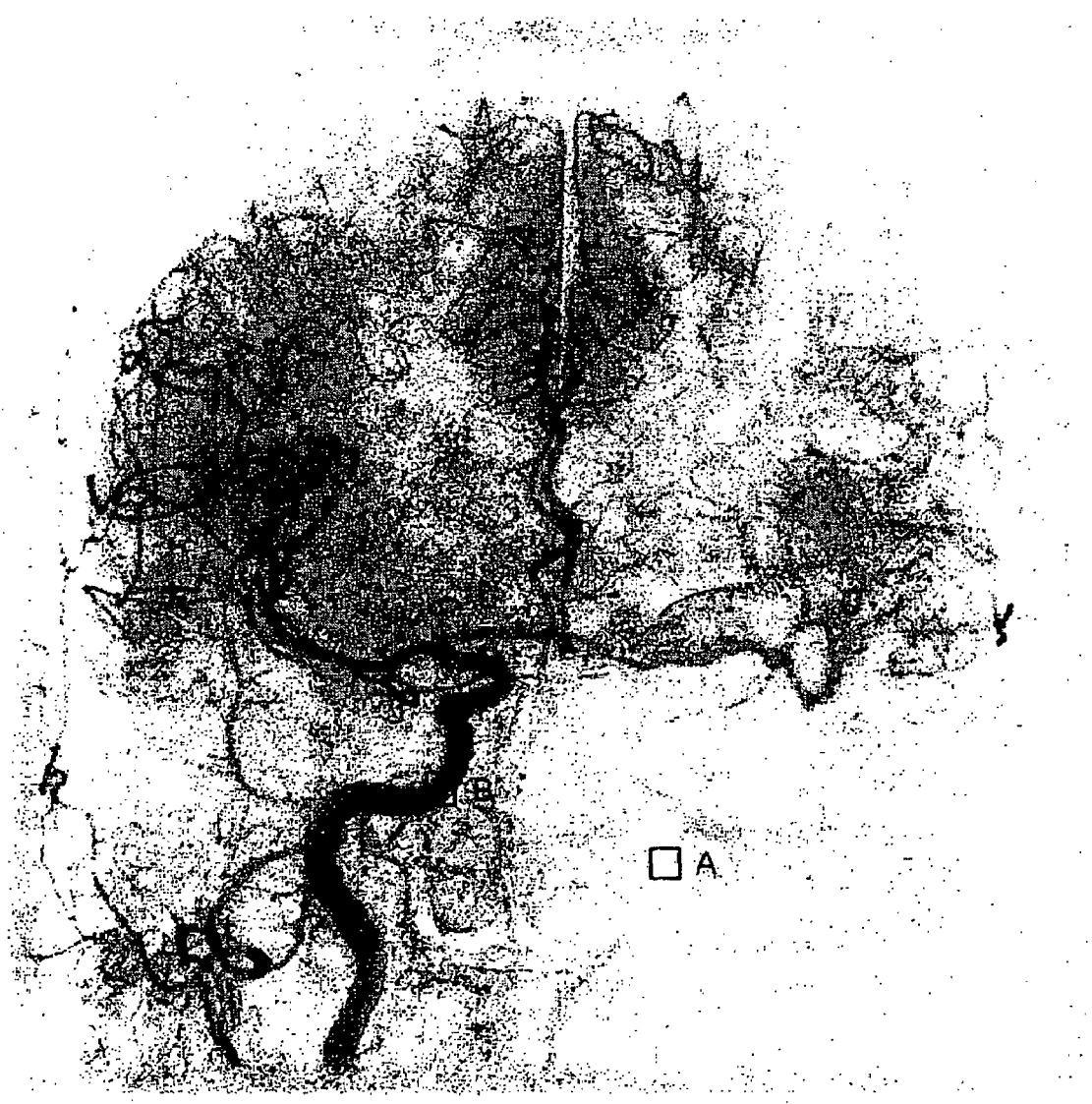
FIG. 4 shows a subtracted image in a DSA sequence on which an area of background points or pixels has been marked, together with an area of vascular points or pixels.

FIG. 4 shows a subtracted image in a DSA sequence on which the following are marked: an area A comprising only background structures and an area B in which the contrast product was distributed and which covers points or pixels containing vascular information.

A second embodiment, comprises determining if each image point or pixel (i,j), (k,j) in the DSA sequence of subtracted images $J_n$ is a point or pixel (k,j) of a background structure (area A in FIG. 4) or a point or pixel (i,j) of the vascular bed (area B in FIG. 4).

One possible embodiment of this point or pixel discrimination is to separate them into two categories is described below. The information provided by an auto- or self-correlation function of the signal representing the intensity variation at a point or pixel (i,j), (k,j) of the images $J_n$ with time. The self-correlation R for a single-dimensional signal X with size N as a function of the lag L is expressed by the equation:

$$R_x(L) = R_l(-L) = \frac{\sum_{k=0}^{N-L-1}(X_k - \tilde{X})(X_{k+L} - \tilde{X})}{\sum_{k=0}^{N-1}(X_k - \tilde{X})^2}$$

in which $\tilde{X}$ represents the mean of the population $(X_0, X_1, \ldots, X_{N-1})$.

In theory, self- or auto-correlation of white noise is equal to its variance for a zero offset L and is equal to zero for any non-zero lag L. In reality, due to the transfer function of the imagery system, the noise self-correlation gradually reduces to zero when the lag varies from zero. Furthermore, auto- or self-correlation of a signal corresponding to a vascular point or pixel (i, j) also reduces towards zero but at a much slower rate than that measured for a background point or pixel (k,j). An embodiment of the invention considers either the slope or the value of the auto- or self-correlation function for a particular lag so as to differentiate between a background point or pixel and a vascular point or pixel.

The slope of the auto- or self-correlation function about the central auto- or self-correlation value can thus be analyzed and its absolute value can be compared with a threshold such that a point or pixel is considered as being a background point or pixel if the absolute value is greater than the threshold, or as a vascular point or pixel if the absolute value is less than the threshold.

As mentioned above, it is also possible to calculate the first values of the auto- or self-correlation function and to compare the last of these first values (for example the second or third value) with a threshold such that a point or pixel is considered to be a vascular point or pixel if the last value is greater than the threshold, or as a background point or pixel if the last value is less than the threshold.

Figure 5:
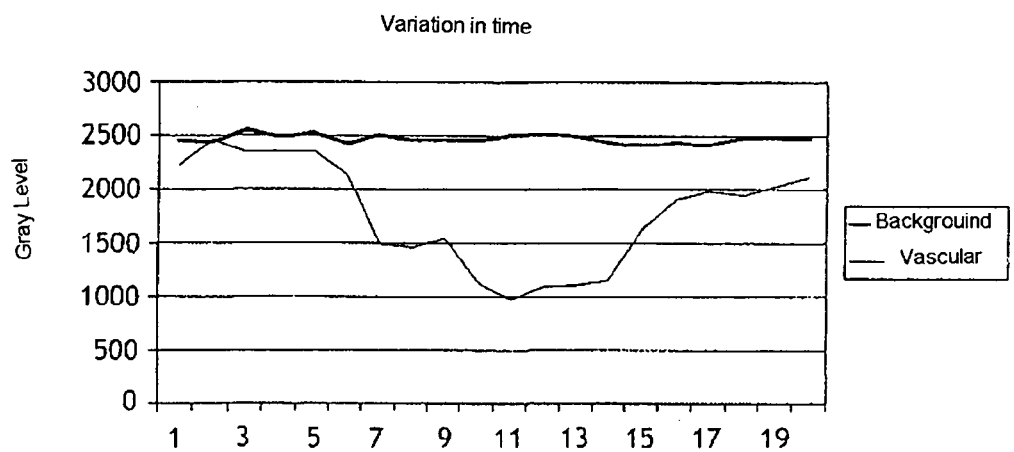
FIG. 5 shows a variation with time of the intensity for a background point or pixel and a vascular point or pixel.

FIG. 5 shows the variation with time of the signal representing the grey level at a background point or pixel and at a vascular point or pixel respectively in a DSA sequence. It can be seen that the signal corresponding to a background point or pixel is practically invariable with time. On the other hand, the signal corresponding to a vascular point or pixel varies with time and reflects the dilution of the contrast product at this point or pixel.

Figure 6:
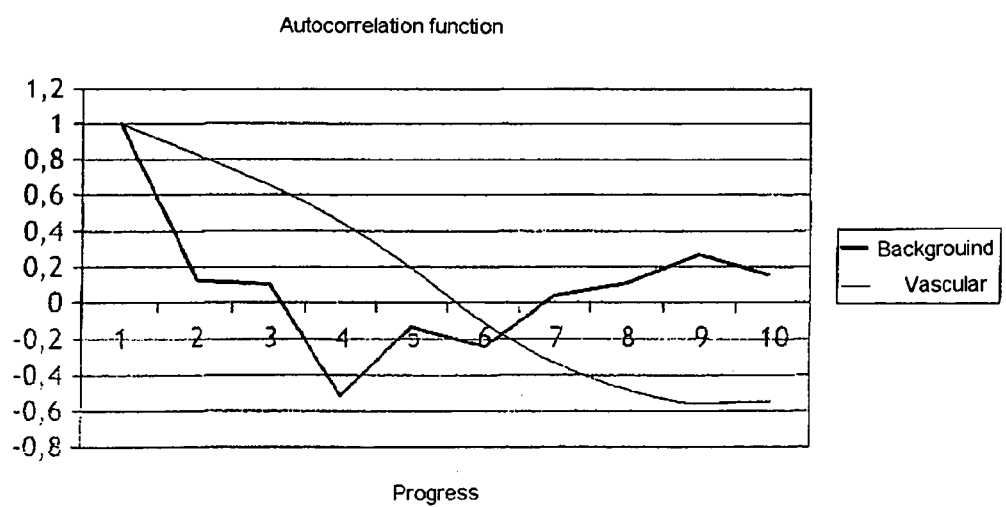
FIG. 6 shows self- or auto-correlation functions of the signals in FIG. 5.

FIG. 6 shows auto- or self-correlation functions of the signals in FIG. 5. It can be seen that auto- or self-correlation of the signal corresponding to the background point or pixel reduces quickly as the distance from the central value (zero lag) increases, while the auto- or self-correlation of the signal corresponding to the vascular point or pixel reduces more progressively.

Once this background point or pixel discrimination has been performed, the process according to the second possible embodiment of the invention includes an inter-image time filtering of background points or pixels (k, j), particularly using a low pass filter capable of reducing random noise variations. More particularly, a first order low pass filter with an infinite impulse response can be used, for which the strength is controlled by the location of its zero and its pole.

The z transform of the transfer function H(z) of the filter is given by $$H(z) = \frac{1-p}{2}\left(\frac{z+1}{z-p}\right),$$

in which the zero is located at the Nyquist frequency (z=−1) and the pole is real at z=p.

The corresponding recursive temporal equation is given by $$Y_n = \frac{1-p}{2}(X_x + X_{n-1}) + p \cdot Y_{n-1}$$

in which X represents the original signal, Y represents the filtered signal and n represents the sample number.

Since arg(H(z))≠0, this filter introduces a phase shift in the output signal, which can be cancelled firstly by filtering during a forward pass in the same direction as time, and then by filtering of the result in a backward pass in the opposite direction.

In a first variant embodiment, vascular points or pixels are not processed. This prevents any modification to vascular information. In a second variant embodiment, a temporal filtering of vascular points or pixels is performed, which strength is limited so as to prevent any modification to vascular information.

The temporal signal at a vascular point or pixel is almost identical to the temporal signal at a background point or pixel for the first images, before arrival of the bolus of the contrast product at this point or pixel.

With reference to FIG. 3, the signal at the vascular point or pixel (i, j) is thus similar to the signal at a background point or pixel (k,j) during the period $[t_0, t_2]$ before the contrast product has reached point or pixel (i, j) at $t_3$.

In the second variant, the temporal signal at the vascular point or pixel (i, j) is only filtered during the period in which this point or pixel is not opacified, in other words before arrival of the contrast product. In this case filtering is identical to filtering used on background points. On the other hand, the signal at the vascular point or pixel is no longer filtered starting from time $t_a$ corresponding to the moment at which the contrast product reaches the location of point or pixel (i, j).

The behavior of the dilution curve is analyzed in order to detect the arrival time $t_a$ of the contrast product at the vascular point or pixel (i,j). As soon as the contrast product arrives, this dilution curve usually changes from zero to a minimum opacification level. Consequently, it is considered that the contrast product arrives at point or pixel (i, j) when the dilution curve at this point or pixel goes beyond a threshold representing a fraction of the minimum opacification.

In order to more precisely determine the arrival time $t_a$ without being excessively affected by noise, it is possible to firstly smooth the signal using the temporal filter for which the equation was given above in the description of the processing of background points, but with a weaker strength p. The maximum (max) and minimum (min) of the signal are then determined for each vascular point or pixel, in order to calculate a threshold value S corresponding to a certain percentage (pc) of the amplitude of the dilution curve according to S=max−pc(max−min). The time $t_a$ can then be determined as being the moment at which the signal (expressed in terms of the grey level) becomes less than this threshold S.

According to an embodiment of the invention, the value of the threshold S is adjusted by making a better estimate of the maximum value max. Instead of considering a single value, it is possible to use the average value determined for the time $[0 \ldots t_a]$ and to recalculate the threshold and the corresponding arrival value.

FIG. 7 shows determination of the time $t_a$ on the smoothed signal corresponding to the signal for the vascular point or pixel in FIG. 5. Note that for initialization reasons, a constant image can be placed at the beginning of the DSA sequence, for example the intensity of this constant image being the average value of the first image $J_0$ in the DSA sequence. If this constant image introduced at the beginning of the sequence is useful for calculating $t_a$, it cannot be used for good initialization of the temporal filter used to filter firstly the background points or pixels and secondly the vascular points or pixels before arrival of the contrast product. The initialization can then be done differently for background points or pixels and for vascular points or pixels.

Thus, for background points or pixels, the filter can be initialized using the average time value of the signal. The forward and backward filtering is then done for example using a value p equal to 0.7. For vascular points or pixels, the filter may be initialized with the average value of the signal between the first image and the image corresponding to the arrival time $t_a$ of the dilution. This is also the part of the signal that will be filtered in the same way as the background points or pixels. On the other hand, as already mentioned, no processing is done on this signal between arrival time of the dilution and the end of the DSA sequence.

The first and second possible embodiments of the invention described above can be combined so as to achieve optimum noise reduction. In this case, the corrected mask image as described in the first embodiment of the invention is used to form DSA sequences that will then be processed according to the second possible embodiment of the invention.

FIG. 8 shows a flow chart illustrating the sequence of operations performed when the first and second embodiments are combined. In FIG. 8, block 10 illustrates acquisition of the mask image M and images $I_n$. Block 20 illustrates filtering (for example bilateral) of the mask image M. Operator 30 illustrates the subtraction operation to obtain subtracted images $J_n$ forming the DSA sequence. Block 40 illustrates the differentiation of the image points between background points or pixels $P_f$ and vascular points or pixels $P_v$. Block 50 illustrates the temporal filtering applied to background points or pixels $P_f$ (over the entire sequence) and vascular points or pixels $P_v$ (only during the period preceding arrival of the contrast product at each of these points or pixels $P_v$).

The qualitative performances of one possible embodiment of the invention were analyzed on a sequence of twenty images. The noise reduction effect was evaluated on the tenth image in the DSA sequence, this noise reduction being measured in terms of a standard deviation measured on a homogeneous region, and the contrast preservation measured on a particular vessel. The following table summarizes these performances.

| Forward/Backward filter | Standard deviation | Contrast |
|---|---|---|
| Without processing | 57.3 | 7.79 |
| Processing with p = 0.7 | 39.24 | 7.86 |
| Processing with p = 0.9 | 36.3 | 7.45 |

FIG. 9 shows a method of evaluating the performances of embodiments of this invention according to which the noise reduction is measured in terms of a standard deviation (Zoom 1) on a homogeneous region and the contrast preservation is measured on a particular vessel (Zoom 2). The use of a filter with strength p=0.7 can achieve a significant noise reduction, while maintaining the aspect of the noise and therefore the contrast of the vessel.

Some of the aspects of the embodiments of the method are as follows, although this list is not limitative or inclusive or exclusive.

The noise reduction processing comprises: for each image point in the sequence of subtracted images, a determination if the point is a background point (or pixel) or a vascular point (or pixel); for each background point (or pixel), applying an inter-image low pass type temporal filter on each image in the sequence; the filter transfer function is expressed as $$H(z) = \frac{1-p}{2}\left(\frac{z+1}{z-p}\right),$$

in which the pole located at z=p controls the strength of the filter; a determination if a point (or pixel) is a background point (or pixel) or a vascular point (or pixel), comprises calculating the auto- or self-correlation function of the time signal corresponding to the values of this point (or pixel) in the sequence of subtracted images and analyzing variations of the auto- or self-correlation function about its maximum central value; the analysis of variations of the auto- or self-correlation function comprises calculating the first values of the function, comparing the last of these first values with a threshold and determining that the point (or pixel) is a background point (or pixel) if the value is less than the threshold, or a vascular point (or pixel) if the value is greater than the threshold; the analysis of the variations in the auto- or self-correlation function comprises analyzing the slope of the function about its central value, comparing the absolute value of the slope with a threshold and determining that the point (or pixel) is a background point (or pixel) if the absolute value is greater than said threshold, or a vascular point (or pixel) if the absolute value is less than the threshold; the inter-image temporal filter is also applied to each vascular point (or pixel), this application being limited to subtracted images corresponding to acquisition times earlier than the time at which the contrast product reaches the vascular point; the time at which the contrast product reaches a vascular point (or pixel) is determined based on a change of opacification at this point (or pixel).

In addition, while an embodiment of the invention has been described with reference to exemplary embodiments, it will be understood by those skilled in the art that various changes may be made in the function and/or way and/or result and equivalents may be substituted for elements thereof without departing from the scope and extent of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. or steps do not denote any order or importance, but rather the terms first, second, etc. or steps are used to distinguish one element or feature from another. Furthermore, the use of the terms a, an, etc. do not denote a limitation of quantity, but rather denote the presence of at least one of the referenced element or feature.

What is claimed is:

1. A method for processing of a radiological image to be used as a mask image in subtracted angiography, comprising:
   acquiring the radiographic image to be used as the mask image;
   processing the mask image to reduce noise therein;
   acquiring a sequence of images ($I_n$) during angiography of blood vessels in an area of interest (104) of a patient; and
   subtracting the mask image from each of the images in the sequence of images ($I_n$) to produce a sequence of subtracted images ($J_n$),
   wherein the reduction of noise in the mask image is adapted to preserve the aspect of vessels and prevent the creation of artifacts in the sequence of subtracted images ($J_n$).

2. The method according to the claim 1, wherein the processing is done by application of a bilateral filter.

3. The method according to claim 1, further comprising:
   processing of a sequence of subtracted images ($J_n$) obtained by subtracting the mask image from each image in a sequence of images ($I_n$) acquired during angiography of blood vessels in an area of interest (104) of a patient, wherein the processing of the sequence of subtracted images ($J_n$) comprises processing for reduction of noise present in the subtracted image ($J_n$) adapted to preserve the aspect of vessels in the subtracted images.

4. The method according to claim 3, wherein the processing for reduction of noise present in the mask image is done by application of a bilateral filter.

5. The method according to claim 1, further comprising:
displaying at least one of the mask image, the sequence of images ($I_n$), and the sequence of subtracted images ($J_n$) on a display screen.

6. The method for processing of a sequence of subtracted images ($J_n$), comprising:
acquiring a radiographic image representative to be used as a mask image;
acquiring a sequence of images ($I_n$) during angiography of blood vessels in an area of interest (104) of a patient;
subtracting the mask image from each of the images in the sequence of images ($I_n$) to produce a sequence of subtracted images ($J_n$); and
processing the sequence of subtracted images ($J_n$) to reduce noise therein, wherein the reduction of noise in the sequence of subtracted images ($J_n$) is adapted to preserve the aspect of vessels and prevent the creation of artifacts in the seuuence of subtracted images ($J_n$).

7. The method according to claim 6, wherein the noise reduction processing comprises:
for each image point in the sequence of subtracted images ($J_n$), determining if the point is a background point (k, j) or a vascular point (i, j); and
for each background point (k, j), apply an inter-image low pass type temporal filter on each image in the sequence.

8. The method according to claim 7, wherein the filter has a transfer function expressed as $$H(z) = \frac{1-p}{2}\left(\frac{z+1}{z-p}\right),$$

in which the pole located at z=p controls the strength of the filter.

9. The method according to claim 8, further comprising:
determining if a point is a background point (k, j) or a vascular point (i, j), by calculating the self-correlation function of the temporal signal corresponding to the values of this point in the sequence of subtracted images; and
analyzing variations of the self-correlation function around its maximum central value.

10. The method according to claim 9, wherein the analysis of variations of the self-correlation function comprises:
calculating the first values of the function;
comparing the last of these first values with a threshold; and
determining that the point is a background point (k, j) if the value is less than the threshold, or a vascular point (i, j) if the value is greater than the threshold.

11. The method according to claim 9, wherein the analysis of the variations in the self-correlation function comprises:
analyzing the slope of the function around its central value;
comparing the absolute value of the slope with a threshold; and
determining that the point is a background point (k, j) if the absolute value is greater than the threshold, or a vascular point (i, j) if the absolute value is less than the threshold.

12. The method according to claim 7, further comprising:
determining if a point is a background point (k, j) or a vascular point (i, j), by calculating the self-correlation function of the temporal signal corresponding to the values of this point in the sequence of subtracted images; and
analyzing variations of the self-correlation function around its maximum central value.

13. The method according to claim 12, wherein the analysis of variations of the self-correlation function comprises:
calculating the first values of the function;
comparing the last of these first values with a threshold; and
determining that the point is a background point (k, j) if the value is less than the threshold, or a vascular point (i, j) if the value is greater than the threshold.

14. The method according to claim 12, wherein the analysis of the variations in the self-correlation function comprises:
analyzing the slope of the function around its central value;
comparing the absolute value of the slope with a threshold; and
determining that the point is a background point (k, j) if the absolute value is greater than the threshold, or a vascular point (i, j) if the absolute value is less than the threshold.

15. The method according to claim 7, wherein the inter-image temporal filter is also applied to each vascular point (i, j), the application being limited to subtracted images ($J_n$) corresponding to acquisition times earlier than the time ($t_a$) at which the contrast product reaches said vascular point.

16. The method according to claim 15, wherein the time ($t_a$) at which the contrast product reaches a vascular point is determined based on a change of opacification at this point.

* * * * *